United States Patent [19]
Roberts et al.

[11] 3,987,759
[45] Oct. 26, 1976

[54] STRATIFIED CHARGE ROTARY ENGINE WITH VARIABLE SPRAY ANGLE FUEL NOZZLE

[75] Inventors: Thomas C. Roberts, Ridgewood; Charles Jones, Hillsdale; Harold D. Lamping, Oakland; David M. Myers, Upper Saddle River, all of N.J.

[73] Assignee: Curtiss-Wright Corporation, Wood-Ridge, N.J.

[22] Filed: June 3, 1975

[21] Appl. No.: 583,478

[52] U.S. Cl. ............................ 123/8.09; 123/32 JV; 239/452
[51] Int. Cl.² ........................................ F02B 53/10
[58] Field of Search .............. 123/8.09, 8.11, 32 JV; 239/452, 453, 514, 541

[56] References Cited
UNITED STATES PATENTS

| | | |
|---|---|---|
| 2,244,394 | 6/1941 | Hautzenroeder ............... 239/452 X |
| 2,536,542 | 1/1951 | Evans et al. ......................... 239/453 |
| 2,796,296 | 6/1957 | Campbell ............................ 239/452 |
| 3,698,364 | 10/1972 | Jones ................................. 123/8.09 |
| 3,894,518 | 7/1975 | Gavrun et al. ..................... 123/8.09 |

FOREIGN PATENTS OR APPLICATIONS

| | | |
|---|---|---|
| 835,818 | 4/1952 | Germany ............................ 239/453 |
| 200,143 | 12/1938 | Switzerland ........................ 239/453 |

*Primary Examiner*—Carlton R. Croyle
*Assistant Examiner*—Michael Koczo, Jr.
*Attorney, Agent, or Firm*—Victor D. Behn; Arthur Frederick

[57] ABSTRACT

A rotary combustion engine having a fuel nozzle for discharging fuel into each working chamber just prior to combustion and in which means are provided for increasing the width of the spray angle of the fuel discharged by said nozzle as the quantity of fuel discharged by the nozzle into each working chamber is increased.

6 Claims, 8 Drawing Figures

STRATIFIED CHARGE ROTARY ENGINE WITH VARIABLE SPRAY ANGLE FUEL NOZZLE

BACKGROUND OF THE INVENTION

The invention relates to rotary internal combustion engines of the type disclosed in prior U.S. Pat. No. 2,988,065 granted on June 13, 1961 on an invention of Wankel et al, and particularly to such an engine designed for operation as a stratified charge engine. Prior stratified charge rotary combustion engines of this type are disclosed in U.S. Pat. Nos. 3,246,636 granted on Apr. 19, 1966 on an invention of Bentele and 3,698,364 granted on Oct. 17, 1972 on an invention of Jones and in co-pending U.S. application, Ser. No. 424,056 filed on Dec. 12, 1973, and now U.S. Pat. No. 3,894,518 on an invention of Gavrun et al.

In rotary engines of the type described in the aforementioned patents and patent application, each engine working chamber, at the time of ignition, has a shape which is relatively long and is quite narrow, particularly at its leading and trailing ends. As a result, combustion of any fuel in the leading and trailing ends of these working chambers tends to be chilled by the adjacent walls of the engine housing and engine rotor thereby resulting in inefficient combustion and in the engine exhaust including unburnt fuel.

SUMMARY OF THE INVENTION

An object of the invention is to provide a stratified rotary combustion engine in which novel means are provided to minimize accumulation of fuel at the leading and trailing ends of each working chamber.

A further object of the invention is to provide a rotary combustion engine having a new and improved stratified charge fuel injection system in which the fuel is promptly ignited as it discharges into each working chamber and in which the engine is provided with a fuel discharge nozzle such that its fuel spray pattern is substantially confined to a small region at the midportion of the chamber at low engine power and as the quantity of fuel discharged into each working chamber is increased to increase the engine power output, the width of the fuel pattern of the fuel discharged from the nozzle increases but not so much as to spread to the leading and trailing ends of each working chamber, at least not until the engine is operating at full or maximum power.

In accordance with one form of the invention, said fuel nozzle comprises a pintle-type nozzle in which the pintle opens the nozzle each time fuel is supplied to the nozzle and the extent of movement of the pintle is limited by an adjustment having an operative connection to the power setting of the engine. Such a variable pintle nozzle is not new by itself, for example, as shown in U.S. Pat. No. 3,830,433 to Miyake granted on Aug. 20, 1974. In this prior patent the purpose of the pintle variable area is to provide the nozzle with a larger discharge opening at higher power settings of the engine. Such a nozzle is also discussed in a paper entitled "Developing a New Stratified Combustion System with Fuel Injection for Reducing Exhaust Emissions in Small Farm and Industrial Engines" and published by the Society of Automotive Engineers (S.A.E.), the paper being dated Jan. 10–14, 1972 and bears the number 720196. Applicants' variable pintle-type fuel nozzle, however, has the further feature in that the nozzle is also designed to widen its fuel spray pattern at higher power settings of the engine. In contrast, in FIG. 18 of said S.A.E. paper, the width of the fuel spray pattern is actually less when the engine is under load.

In another form of the invention, said engine fuel nozzle comprises a nozzle having a plurality of fixed discharge openings or orifices, each discharging at a different angle from the nozzle axis. This multi-orifice nozzle is provided with an adjustable element which is operatively connected to the engine power setting member so that only certain of the nozzle orifices are open at low power settings of the engine, and at high power settings of the engine, additional orifices are open, these latter orifices providing the nozzle with a wider overall spray pattern.

A still further object of the invention is to provide a rotary combustion engine with a fuel injection nozzle having such a variable width spray pattern in combination with an air inlet passage supplying air to each engine working chamber, with said inlet passage being characterized by the absence of any air throttle valve. In lieu of the usual air throttle valve, the engine power output is regulated by varying the quantity of fuel supplied by said fuel nozzle to each engine working chamber. With this combination, the variable width fuel pattern of the fuel discharge nozzle can be made such that the fuel spray pattern of the fuel discharged into each working chamber can be made to embrace or intersect a proper amount of air for ready ignition and efficient combustion throughout the power range of the engine even though, because of the absence of an air throttle valve, each working chamber is supplied with a substantial excess of air.

Another object of the invention is to provide a novel stratified charge rotary combustion engine comprising a combination of the stratified charge configuration disclosed in the aforementioned co-pending application with means associated with the power controlling fuel nozzle to vary the fuel spray pattern of the nozzle so that, except possibly when the engine is operating at full power, the fuel pattern does not spread to the leading and trailing ends of each working chamber.

Other objects of the invention will become apparent upon reading the annexed detailed description in connection with the drawings.

DESCRIPTION OF PREFERRED EMBODIMENTS

Figure 1:
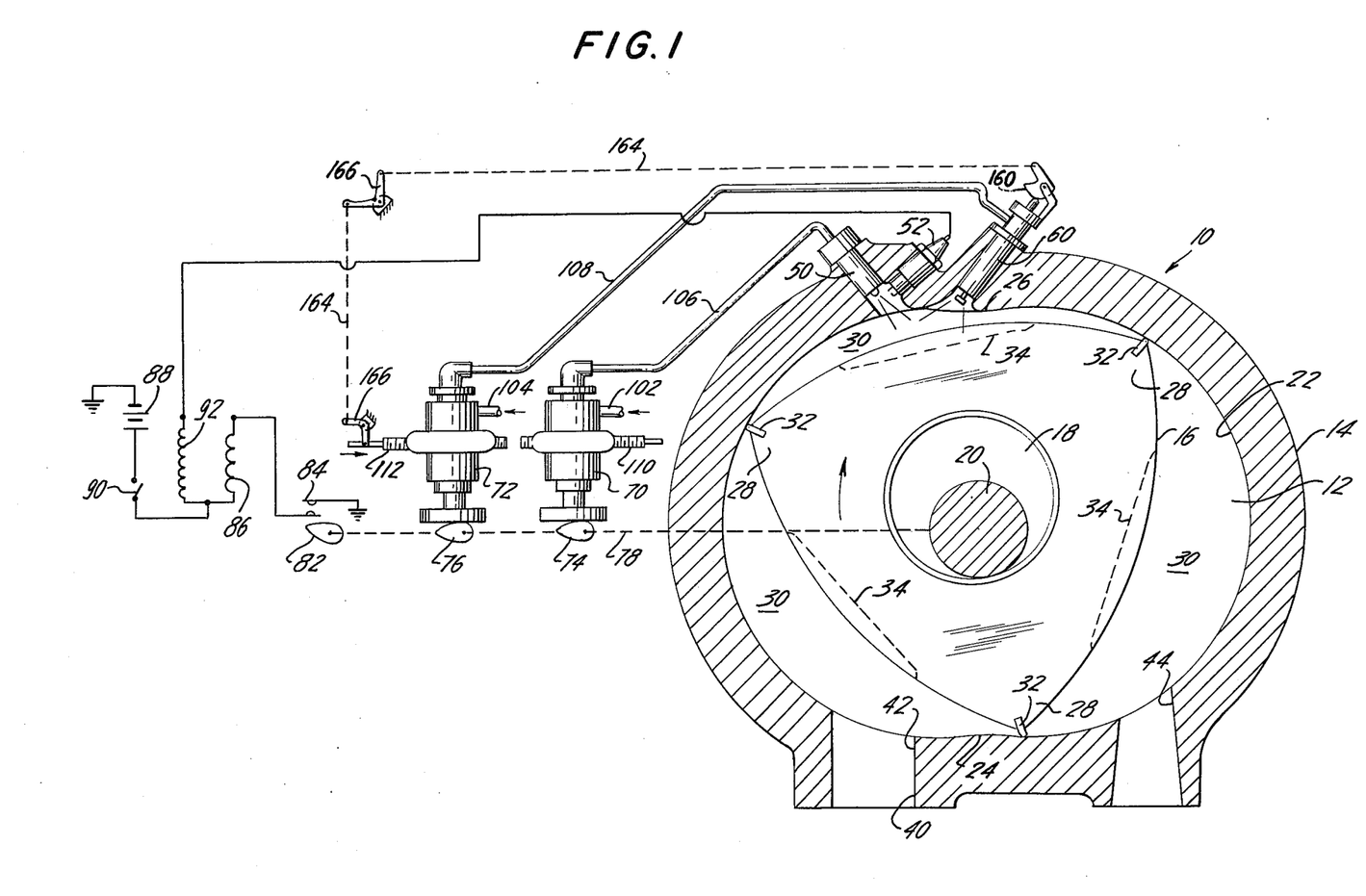
FIG. 1 is a schematic view of a rotary combustion engine embodying the invention.

Referring to FIG. 1, a rotating combustion engine is schematically indicated at 10, the engine being generally similar to the type disclosed in the aforementioned patents and patent application. The engine 10 comprises an outer body or housing consisting of two axially spaced end housings 12 (only one of which is shown in FIG. 1) between which an intermediate or rotor housing 14 is disposed, the housings 12 and 14 being secured together to form the engine cavity therebetween. An inner body or rotor 16 is journaled for rotation within said housing cavity on an eccentric portion 18 of a shaft 20 which extends co-axially through and is supported by bearings (not shown) in the end housings 12.

The peripheral inner surface 22 of the intermediate housing 14 has a multi-lobe profile which preferably is basically an epitrochoid. As illustrated, the multi-lobe peripheral surface 22 has two lobes joined at junctions 24 and 26. With a two-lobed peripheral surface 22, the rotor 16 has a generally triangular profile with apex portions 28 having sealing cooperation with peripheral surface 22 to form three engine working chambers 30 between the rotor 16 and engine housings 12 and 14. For this purpose, each of the rotor apex portions 28 is provided with a seal 32 which extends across the rotor between the inner walls of the end housings 12. The rotor 16 also preferably has suitable seals (not shown) on its end faces for sealing contact with the inner walls of the end housings. Each of the three peripheral surfaces of the rotor preferably is provided with a trough-like recess 34.

The engine 10 also includes suitable gearing (not illustrated) between the rotor 16 and the engine housing to control the relative rotation of the rotor. Such gearing is conventionl and preferably is similar to that illustrated in the aforementioned prior patents.

An air intake passage 40 supplies air to an air intake port 42 disposed adjacent to and at one side of the junction 24 of the two lobes of the trochoidal peripheral surface 24. As illustrated, the air intake passage 40 extends through the rotor or intermediate housing 14 and the port 42 opens through its inner trochoidal peripheral surface 22. As is common in such rotary engines, the air intake port could also open through an end housing 12. The air intake passage 40 is characterized by the absence of any air throttle valve, such as is commonly provided in internal combustion engines for regulating the engine power output. An exhaust port 44 is also provided in the intermediate housing 14 adjacent to and on the opposite side of the junction 24 from the inlet port 42. The engine combustion is initiated in the engine working chambers 30 in the vicinity of the other junction 26 of the two lobes of the trochoidal surface 22.

With the engine structure described and with the engine rotating clockwise, as viewed in FIG. 1, the volume of each working chamber 30 periodically increases from a minimum volume condition, when it is located adjacent to the lobe junction 24 and opens to the intake port 42, to a maximum volume condition, and closes to the intake port 42, then said chamber decreases in volume to compress its intake charge until the working chamber again reaches its minimum volume condition, but at this time at the lobe junction 26. Thereafter, the volume of said chamber again increases to a maximum condition and then decreases to its minimum condition as the chamber comes into communication with the exhaust port 44 at the lobe junction 24 to complete the cycle.

A first fuel nozzle 50 is mounted on the intermediate housing 14 adjacent to the lobe junction 26. The fuel nozzle 50 has its fuel discharge end disposed in a recess opening to the trochoidal surface 22 for discharging fuel into each working chamber after the air-intake charge within the chamber has been substantially compressed and combustion is about to be initiated. A spark plug type igniter 52 is also mounted on the intermediate housing adjacent to the lobe junction 26 and adjacent to the nozzle 50. The electrodes of the spark plug 52 are disposed adjacent to the discharge end of the nozzle 50 preferably so that said nozzle discharge end and the spark plug electrodes both open through the trochoidal surface 24 through a common recess. In addition, the fuel nozzle 50 and spark plug 52 preferably are disposed so that at least a portion of the fuel vapor produced by fuel spray discharged from the nozzle passes in close proximity to said spark plug electrodes immediately as the fuel leaves the nozzle 50 for ready ignition by said spark plug.

The ignition circuit for the spark plug 52 is arranged to fire the spark plug while fuel is discharging from the nozzle 50 into a working chamber 30 so that a portion of this fuel is ignited at the fuel nozzle 50 as it discharges from the nozzle and the burning of this initial portion of the fuel discharged from the nozzle 50 ignites the balance of the fuel discharging from said nozzle. The timing of the spark from the spark plug 52 is such that it fires during the period of discharge from the nozzle 50 into a working chamber 30 and preferably during the initial period of such discharge into each working chamber 30.

A second or main fuel nozzle 60 is mounted on the rotor or intermediate housing 14 also adjacent to the lobe junction 26 so that this second nozzle is disposed adjacent to the fuel nozzle 50 and spark plug 52. Like the fuel nozzle 50, the fuel nozzle 60 has its discharge end disposed close to the trochoidal surface 22 so as to minimize the size of the recess at the trochoid surface 22 and to minimize leakage around the apex seals 323 as they pass over the nozzle recess at the trochoidal surface 22. As in the case of the nozzle 50, the second fuel nozzle 60 is arranged to initiate the discharge of its fuel into each working chamber 30 after the air charge in said chamber has been substantially compressed and combustion is about to be initiated, in a timely manner relative to discharge of fuel from the nozzle 50. For example, at low engine loads discharge of fuel from the main nozzle 60 into each working chamber 30 may be initiated somewhat after fuel is discharged from the nozzle 50 whereas at high engine loads in order to provide time for fuel discharge from the main nozzle 60, the fuel discharge from this main nozzle may be initiated somewhat before fuel is discharged from the pilot nozzle 50. As a result, the combustion flame resulting from the ignition by the spark plug 52 of the fuel discharging from the first nozzle 50 into each working chamber 28 is effective to ignite the fuel discharged from the main nozzle 60 promptly as the fuel is discharged by said main nozzle into said chamber. Thus, the burning fuel discharged by the nozzle 50 functions as a pilot flame to ignite fuel as it is discharged from the nozzle 60.

A pair of similar positive displacement pumps 70 and 72 are provided for discharging predetermined quantities of fuel from the nozzles 50 and 60 respectively into each working chamber 30. Cams 74 and 76, driven from the engine shaft 20 by means schematically indicated at 78, are arranged to activate the fuel pumps 70 and 72. As disclosed in said prior patents, the engine shaft rotates at three times the speed of the rotor and therefore in order to supply fuel successively to each of the three working chambers 30, the shaft 20 is arranged to activate each fuel pump 70 and 72 once each revolution of the shaft. Accordingly, each of the pumps 70 and 72 is effective to discharge a predetermined quantity of fuel per pump stroke into each working chamber 30 each time the working chamber comes under the fuel nozzles 50 and 60.

The relative timing of the cams 74 and 76 may be varied by means (not shown) in accordance with changes in an engine operating condition such as speed and/or load to alter the relative initiation of fuel discharge from the two nozzles 50 and 60. Also, instead of modifying the timing of cams 74 and 76, the pumps 70 and 72 could include conventional means to vary the time of initiation of their fuel discharge.

A third cam 82, also driven from the shaft 22, is arranged to operate the make-and-break contacts 84 of the ignition circuit. The ignition circuit illustrated is conventional and includes a coil, the primary 86 of this coil being connected to a battery 88, ignition switch 90 and the make-and-break contacts 84. The secondary 92 of the ignition coil is connected to the spark plug 52 by a line 94. The cam 82 is positioned so as to activate the spark plug 52 preferably at substantially the same time fuel begins to discharge from the nozzle 50. As already discussed, the spark plug 52 fires during fuel discharge from the nozzle 50 into a working chamber 30 and preferably during the initial portion of such discharge into each chamber.

The fuel pumps 70 and 72 may be conventional type pumps, for example, of the type shown in aforementioned patent No. 3,246,636 and in said co-pending application. The pumps 70 and 72 are provided with fuel intake passages 102 and 104 respectively and discharge passages 106 and 108 for supplying fuel to the fuel nozzles 50 and 60 respectively. The fuel pumps 70 and 72 also have movable rack means 110 and 112 respectively for varying the quantity of fuel delivered per pump stroke to their respective fuel nozzles 50 and 60 for discharge into the engine working chambers 30.

The engine 10 and its fuel and ignition systems so far described, are generally similar to that described in the aforementioned co-pending application of Gavrun et al. With this combination, the engine power output is regulated by varying the quantity of fuel discharged from the nozzle 60 into each working chamber 30 by movement of the rack 112 of its fuel pump 72 to vary the output of said pump 72 per pump stroke. The fuel discharged from the nozzle 50, however, may be held constant over the engine power range or it may be adjusted by means of its adjusting rack 110 for optimum ignition condition. The pump 72 is designed so that the quantity of fuel delivered per pump stroke is increased as the rack 112 is moved toward the left. In this description, the references to direction, such as left or right, up or down, refer to movement of a particular part as viewed in the drawings.

Figure 2:
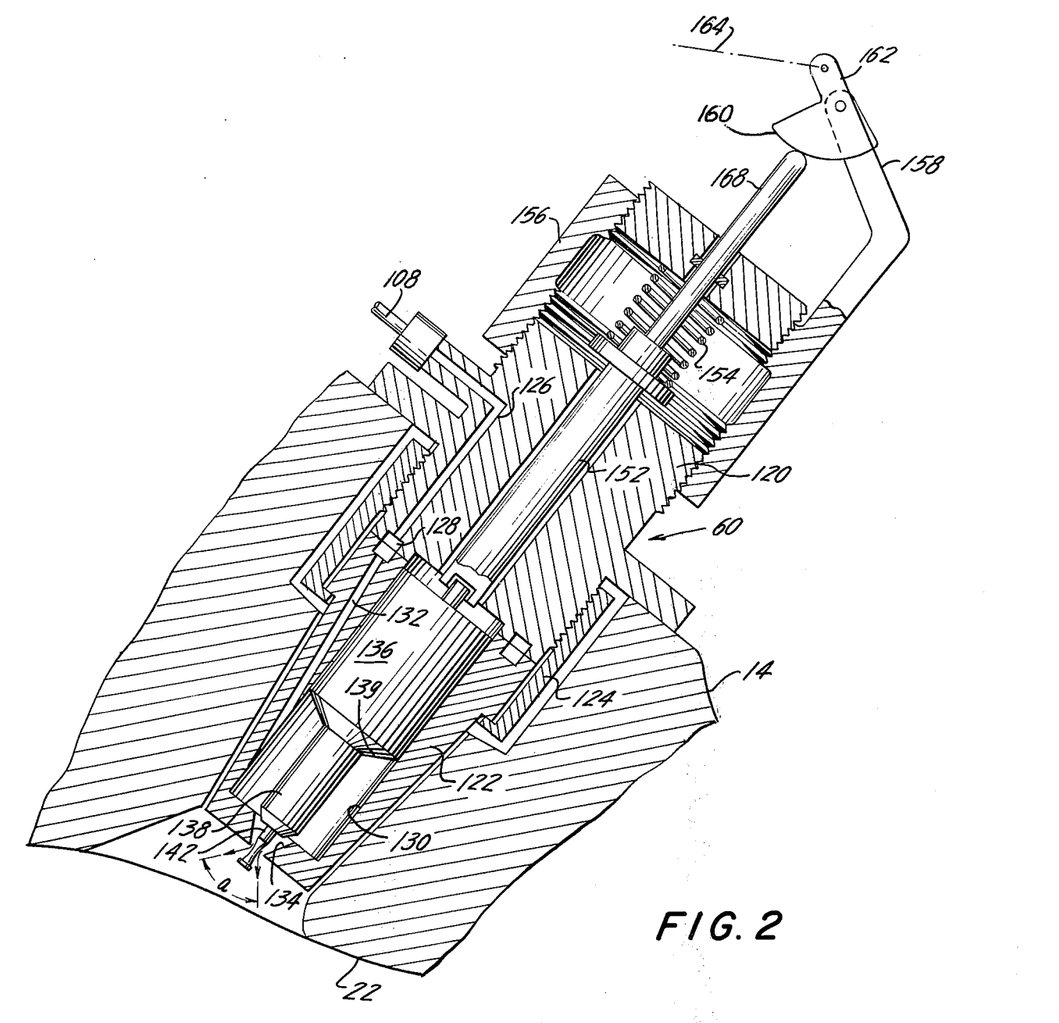
FIG. 2 is an enlarged detailed view of the main fuel nozzle of FIG. 1.
Figure 3:
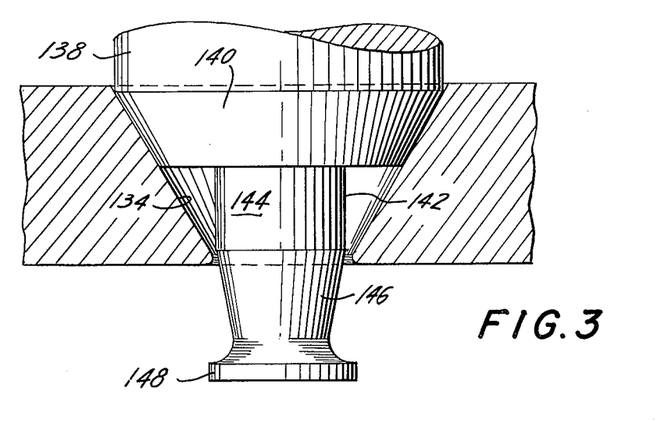
FIG. 3 is a further enlarged view of the discharge end of the nozzle with the pintle in its closed position.
Figure 4:
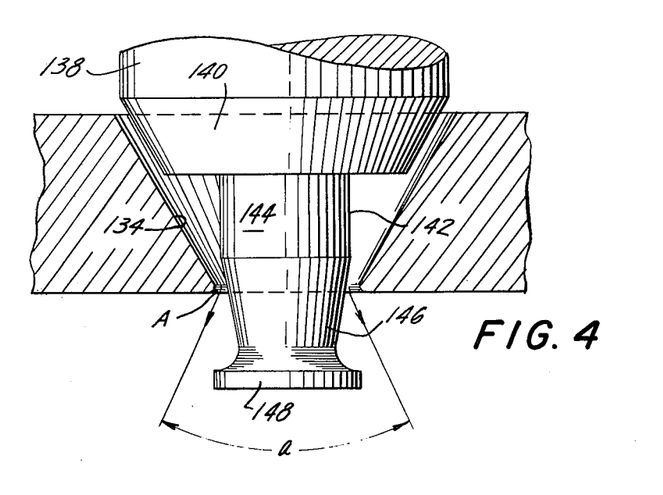
FIG. 4 is a view similar to FIG. 3 showing the pintle nozzle partly open and showing the nozzle spray pattern.
Figure 5:
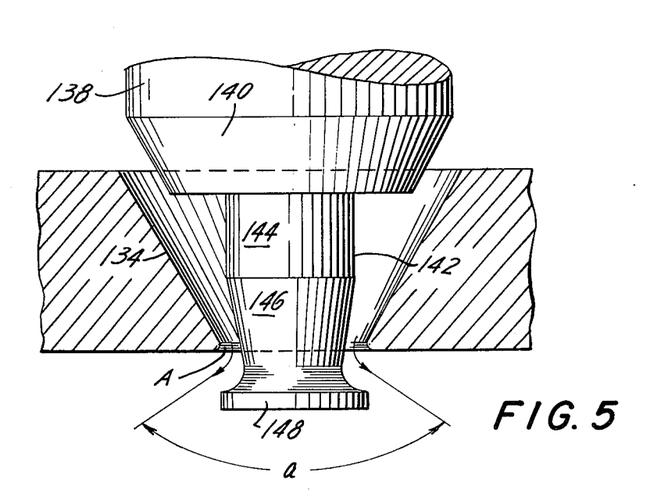
FIG. 5 is also a view similar to FIG. 3 but showing the pintle nozzle fully open and showing the wider spray pattern of the nozzle.

As illustrated, the nozzle 60 is a variable area pintle type nozzle, the details of which are best seen in FIGS. 2–5. In FIGS. 2 and 4 the nozzle is shown in its partly open position. In FIG. 3 the nozzle is closed and in FIG. 5 it is fully open.

The nozzle 60 has a two-part body structure 120 and 122 held together by a threaded sleeve 124. The fuel supply passage 108 from the pump 72 leads to a passage 126 in the nozzle body member 120. This passage 126 terminates at an annulus 128 disposed at the junction of the two nozzle body members 120 and 122. The nozzle body member 122 is hollow to form a cylindrical chamber 130 and said body member 122 has a passage 132 running from the annulus 128 to the downstream end of the chamber 132. The downstream wall of the nozzle chamber 132 has an orifice 134 through which the fuel supplied to the nozzle discharges into each working chamber.

A pintle member 136 has an enlarged upper end which is slidably fitted within the cylindrical chamber 130. The lower or discharge end of the pintle 136 has a reduced diameter portion 138 to form a step or shoulder 139. The orifice 134 has a conical profile which converges in a downstream direction and the lower end of the reduced diameter pintle portion 138 has a conical seat 140 which is adapted to seat against the conical orifice 134 to close the nozzle 60 (See FIG. 3).

A needle portion 142 projects co-axially from the pintle portion 138 and extends co-axially through the nozzle orifice 134. The needle portion 142 has an upper cylindrical portion 144 and a downstream tapering portion 146 which merges in a smooth streamlined manner in an extreme downstream end or head portion 148 of increased diameter.

The upper end of the pintle 136 has a push connection with a rod-like member 152 which is urged by a spring 154 in a direction to move the pintle seat 140 down against the orifice 134 to close the nozzle. The spring 154 is retained in position by a housing extension 156. The housing extension 156 has an arm 158 on which a cam 160 is pivotally mounted. The cam 160 has an arm 162 which is operatively connected to the rack 112 by means schematically indicated at 164 and including bell crank levers 166, (See FIG. 1). The rod member 152 has an extension 168 for engagement with the cam 160.

With the structure of the nozzle 60 so far described, when fuel under pressure is supplied to the nozzle via the passage 108, this fuel enters the lower portion of the nozzle chamber 130 and acts on the pintle shoulder 139 to raise the pintle 136 against the spring 154 thereby opening the nozzle orifice 134 for fuel discharge therethrough. Once the nozzle pintle opens the nozzle discharge orifice 134, the minimum discharge area A of the nozzle occurs between the downstream end of this orifice and the tapered portion 146 of the pintle needle.

The extent to which the nozzle pintle 136 moves in a nozzle opening direction is limited by engagement of the extension 168 with the cam 160. When the engine power regulating member or rack 112 is moved in a power increasing direction, that is, in a leftward direction to increase the fuel flow output from the pump 72, the connection 164 serves to rotate the cam 160 clockwise, to an extent dependent on the magnitude of the power increasing movement of said rack 112. As shown in FIG. 2, the cam 160 is so shaped that when the rack 112 is moved clockwise to a higher power setting, the cam permits further upward movement of the nozzle pintle 136 than when the rack 112 is set at a lower engine power position. Because the tapered portion 146 of the pintle needle extends through the nozzle orifice 134 and because the diameter of this tapered portion decreases in a downstream direction, the minimum discharge area A of the nozzle orifice 134 is greater when the pintle is permitted by the cam 160 to move further upward in an opening direction. That is, the size of the discharge area A of the fuel nozzle 60 increases at higher power settings of the fuel pump 72. The change in the minimum discharge area A of the nozzle orifice 134 is evident from a comparison of FIGS. 4 and 5.

Because of this increase in the nozzle minimum discharge area A with increase in the quantity of fuel discharged by the nozzle 60 into each engine working chamber 30, better atomization of the fuel spray is insured over the entire power range of the engine.

The large diameter head portion 148 at the end of the nozzle needle 142 is sufficiently large relative to the minimum diameter of the orifice 134 and has smooth or streamlined connection to the small diameter end of the tapered portion 146 of the pintle needle, so that as the pintle rises, this head portion becomes effective in spreading the spray pattern of the fuel discharged from the nozzle orifice 134. The cone angle of this fuel spray pattern is indicated by the reference letter $a$ in the drawings. As is evident from FIGS. 4 and 5, this fuel spray angle $a$ increases as the nozzle pintle is permitted to move further upward, that is, when the rack 112 of the fuel pump 72 is moved to higher power settings.

From the foregoing description, it is evident that the fuel spray pattern of the fuel discharged from the nozzle 60 progressively widens as the quantity of fuel supplied to each engine working chamber is increased. As described, the engine air intake passage 40 has no throttle valve and therefore, particularly at low power settings, each engine working chamber 30 has a substantial amount of excess air. Because of this excess air, even though the spray angle $a$ of the fuel spray pattern of the nozzle 60 is quite small at low engine power settings, an adequate mixture of air and fuel is insured for ready ignition and complete combustion. As the quantity of fuel discharged by the nozzle 60 increases, the spray angle $a$ or width of the fuel spray pattern increases to insure adequate mixture of the fuel with air in each working chamber thereby insuring complete combustion.

In FIG. 1 the upper engine working chamber 30 is illustrated in a position at which combustion has just been or is about to be initiated in that chamber and the axis of the fuel spray pattern from the main nozzle 60 is directed approximately toward the midportion of this chamber relative to the leading and trailing ends of said chamber. Accordingly, because the fuel spray angle $a$ or width of the fuel spray pattern is quite narrow at low fuel flows and since combustion is initiated promptly as fuel discharges from the nozzle 60, the burning of this fuel is largely confined to the mid-region of the working chamber. Although the fuel spray angle $a$ increases as the quantity of fuel supplied to each working chamber increases, because combustion of the fuel is promptly initiated, the combustion is still largely confined to the mid-region of the working chamber undergoing combustion except possibly when the engine is operating at full power.

It is apparent with the present invention, since combustion is largely confined to the mid-region of each working chamber 30, the chilling effect of the housing and rotor surfaces on the narrow leading and trailing ends of each working chamber 30 of the rotary engine is minimized. This serves to ensure more efficient combustion in such a rotary engine and minimizes harmful exhaust emissions from the engine.

The variable pintle fuel nozzle 60 has been described in connection with the rotary engine stratified charge fuel system of the aforementioned co-pending application of Gavrun et al. It is also within the scope of the invention to use such a variable pintle nozzle in connection with other stratified charge fuel systems for rotary engines, for example, a system such as shown in the aforementioned Bentele patent. The combination of such a pintle nozzle 60 in the fuel system of the Gavrun et al application is particularly advantageous because the torch-like pilot flame produced by the fuel nozzle 50 makes initiation of combustion more reliable notwithstanding the variable width of the spray pattern of the fuel discharged from the main nozzle 60.

The invention is not limited to use of the particular type of fuel nozzle shown in FIGS. 2–5 for increasing the spray angle pattern of the fuel discharged from the nozzle as the quantity of fuel discharged is increased. For example, it is also possible to use a fuel nozzle having a plurality of fixed orifices, each spraying at a different angle to the nozzle axis, but in which means are provided to limit the fuel spray at low fuel flows so the overall spray pattern is relatively small but at higher fuel flows additional orifices of the nozzle are uncovered to increase the overall width of the fuel spray pattern. Such a fuel nozzle is illustrated in FIGS. 6–8.

Figure 6:
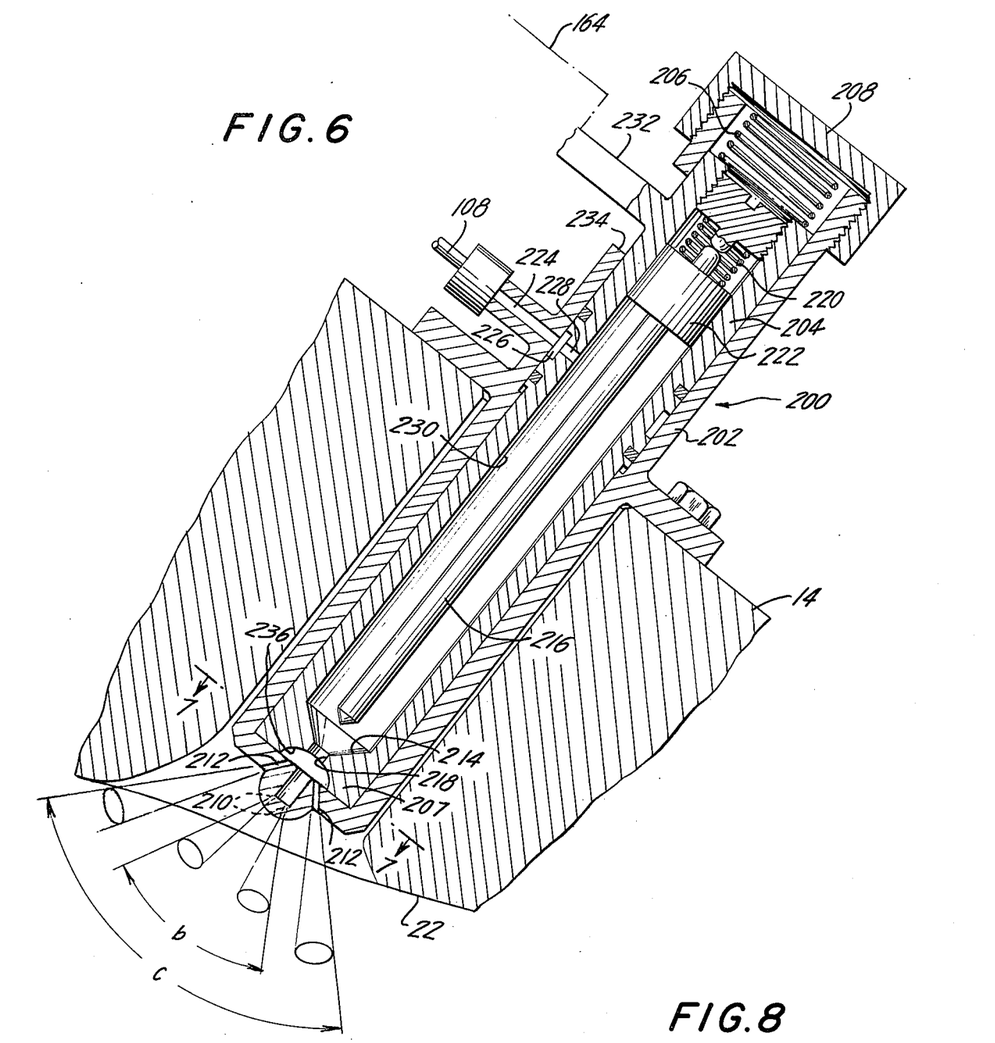
FIG. 6 is a view of a modified form of fuel nozzle for use in the engine of FIG. 1.
Figure 7:
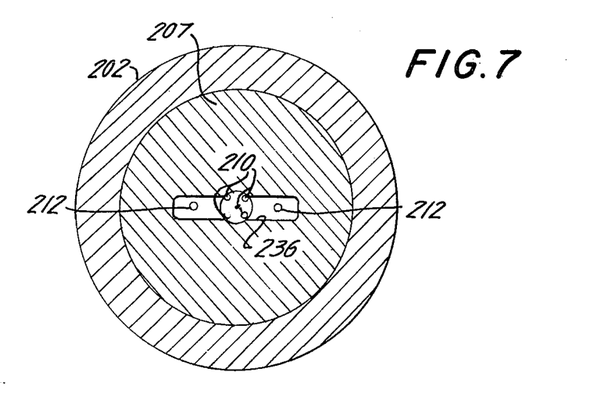
FIG. 7 is a sectional view taken along line 7—7 of FIG. 6.
Figure 8:
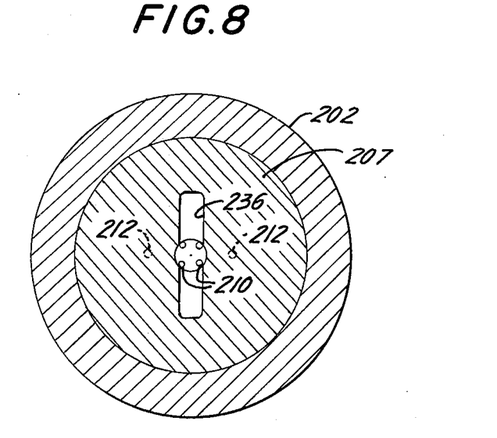
FIG. 8 is a view similar to FIG. 7 but showing the nozzle in its low power position.

FIGS. 6–8 show a fuel nozzle 200 which is to be mounted on the engine rotor housing 14 in place of the nozzle 60 in FIG. 1. The plane of the section of FIG. 6 is the same plane as that of the sections of FIGS. 1 and 2, namely, a mid-plane through the rotor 16 transverse to the axis of the rotor.

The nozzle 200 has a housing 202 secured to the engine rotor housing 14 and within which a cylindrical sleeve 204 is rotatively received. A spring 206 is disposed between the outer end of the sleeve 204 and a cap 208 closing the outer end of the nozzle housing 202. The spring 206 urges the inner end 207 of the sleeve 204 against the adjacent inner end of the housing 202.

The inner end of the nozzle housing has a first plurality of nozzle openings or orifices 210 and a second plurality of such orifices 212. The inner end of the nozzle sleeve 204 has a conical valve seat 214 for the nozzle pintle 216. The conical valve seat 214 terminates in an opening 218 and the pintle 216 is longitudinally slidable within the sleeve 208 and is urged toward the valve seat 214 by a spring 220 which acts against the head end 222 of the pintle 216. Fuel under pressure from the pump 72 is supplied to the fuel nozzle 200 by the fuel supply line 108. The fuel line 108 communicates with a passage 224 in the nozzle housing 202. The passage 224 ends at an annulus 226 in the sleeve 204 and an opening 228 through the sleeve supplies fuel from the annulus 226 to the annular space 230 between the pintle 216 and the sleeve 204.

The sleeve 204 has an arm 232 extending through a slot 234 in the nozzle housing 202. The arm 232 is connected to the power control rack 112 for the fuel pump 72 by means of the operative connection schematically indicated by reference numeral 164.

The inner end 207 of the sleeve 204 has a transverse trough or recess 236. When the rack 112 of the fuel pump 72 is set for high power operation of the engine, the connection 164 is effective to rotate the nozzle sleeve 204 to its position of FIGS. 6 and 7. In this position, the sleeve recess 236 uncovers the nozzle orifices 212. The other nozzle orifices 210 are open in all rotative positions of the sleeve 204. When the rack 112 of the fuel pump 72 is set for low power operation, the connection 164 is operative to rotate the nozzle sleeve 204 90° from its position of FIG. 7 to its position of FIG. 8. In this latter position, the inner end of the sleeve 204 is effective to close the outer nozzle orifices 212, the nozzle orifices 210, however, remain open. A suitable lapped joint preferably is provided between the end surface of inner end 207 of the sleeve 204 and the adjacent surface of the nozzle housing 202 to insure positive control of the nozzle orifices 212. Thus, the inner end 207 of the sleeve 204 acts as a valve to open and close the nozzle orifices 212 depending on whether the rack 112 of the fuel pump 72 is set for high or low engine power.

When fuel under pressure is supplied to the fuel nozzle 200 from the line 108, it enters the annular space 230 and acts against the head end 222 of the pintle to raise the pintle 216 against the spring 220. As a result, the pintle rises from the valve seat 214 to open the nozzle. Fuel then discharges through the nozzle orifices 210 and, with the nozzle sleeve 204 set to its high power position of FIGS. 6 and 7, also through the nozzle orifices 212. If, however, the nozzle sleeve 204 is set for its low power position of FIG. 8, then the nozzle orifices 212 are closed by the end 207 of the sleeve 204 and fuel discharges only from the nozzle orifices 210. As is illustrated in FIG. 6, when only the nozzle orifices 210 are open, the overall spray angle, in the plane of rotation of the rotor 16, of the fuel spray pattern discharged by the nozzle is indicated by the angle b. When, however, the engine power control member 112 is set for high power, the nozzle sleeve 204 is rotated 90° to uncover the nozzle orifices 212 whereupon the overall spray angle, in the plane of rotation of the rotor 16, of the nozzle fuel spray pattern increases as indicated by the angle c. Unlike the fuel nozzle 60, the spray pattern of fuel nozzle 200 has only two steps or widths, the one indicated by the spray angle b for low engine power output and the other indicated by the angle c for higher engine power outputs. It is obvious, however, that the nozzle 200 could be modified to provide additional steps by providing the nozzle with additional orifices which are successively opened as the power setting of the rack 112 is increased.

The discharge opening of the nozzle 200 is made up of the individual orifices 210 and 212. As in the case of the nozzle 60, when the engine power control member 112 is set for high engine power, the effective area of the discharge opening of the nozzle 200 is increased because the orifices 212 are then uncovered. Hence, as in the case of the nozzle 60, this increase in the discharge opening of the nozzle 200 at higher fuel flow is effective to insure better fuel atomization over the entire power range of the engine.

FIG. 1 discloses a specific form of ignition system and fuel pump. It is obvious, however, that the invention is not limited to this form of ignition system or fuel pump. Thus, it should be understood that this invention is not limited to the specific details of construction and arrangement thereof herein illustrated and that changes and modifications may occur to one skilled in the art without departing from the spirit or scope of the invention.

What is claimed is:
1. A rotary combustion engine comprising:
   a. an outer body having an internal cavity, the peripheral surface of which has a multilobe profile, said body also having an air intake passage and a combustion gas exhaust passage with said air intake passage being characterized by the absence of any throttle valve;
   b. an inner body of generally polygonal profile mounted for relative rotation within said outer body having sealing cooperation with said peripheral surface to define a plurality of working chambers which vary in volume in response to said relative rotation;
   c. a fuel injection nozzle mounted on said outer body and having a nozzle discharge opening for discharging fuel into each working chamber after the air charge in said chamber has been substantially compressed;
   d. pump means for supplying fuel to said nozzle for discharge therefrom into each working chamber;
   e. means for initiating combustion of the fuel discharged by said nozzle promptly as it enters each working chamber;
   f. a power control member movable for varying the quantity of fuel supplied by said pump means to said nozzle for discharge therefrom into each working chamber so as to vary the engine power output; and
   g. said fuel injection nozzle including a movable nozzle member such that said nozzle member is movable in one direction to increase both the effective area of the nozzle discharge opening and the width of the fuel spray pattern discharged by the nozzle, said nozzle also including means operatively connected to said power control member and operatively associated with said movable nozzle member such that both the effective area of the nozzle discharge opening and the width of the nozzle fuel spray pattern is greater at a high power setting of said power control member than at a low power setting of said power control member.

2. A rotary combustion engine as claimed in claim 1 and in which the axis of the fuel spray pattern discharged from said nozzle is directed, during its discharge, generally toward the midportion of each working chamber relative to the leading and trailing ends of said chamber.

3. A rotary combustion engine as claimed in claim 1 in which said movable nozzle member is a pintletype member having a portion protruding through the nozzle discharge opening with said protruding portion being shaped to increase the width of the nozzle fuel spray pattern at said high power setting of said power control member and also to increase the effective area of the nozzle discharge opening at said high power setting and further in which said nozzle means operatively connected to the power control member is movable stop to limit the extent to which the nozzle pintle can move in a direction to increase the nozzle discharge opening.

4. A rotary combustion engine as claimed in claim 1 and in which the nozzle discharge opening consists of a plurality of discharge orifices and said nozzle means is effective to increase the number of discharge orifices which are open to discharge fuel as the fuel supplied by the nozzle is increased at said high power setting such that the overall width of the fuel spray pattern of the nozzle is increased and the effective area of the nozzle discharge opening is increased.

5. A rotary combustion engine as claimed in claim 1 in which said combustion initiating means includes an igniter mounted on the outer body and a second fuel injection nozzle also mounted on the outer body for discharging fuel into each working chamber through a recess in said multi-lobe peripheral surface, said second nozzle being disposed adjacent to said igniter with the electrode end of said igniter being disposed in said recess for prompt ignition of the fuel discharged by said second nozzle, and further in which said first mentioned nozzle is arranged to discharge at least a portion of its fuel into each working chamber in generally the same region as the fuel discharged from the second nozzle so that the burning of the fuel discharged from the second nozzle is effective as a pilot burner to cause prompt ignition of the fuel discharging from the first nozzle.

6. A rotary combustion engine as claimed in claim 5 and in which the axis of the fuel spray pattern discharged from said first mentioned nozzle is directed, during its discharge, generally toward the midportion of each engine working chamber relative to the leading and trailing ends of said chamber.

* * * * *